US011402331B2

(12) United States Patent
Sun et al.

(10) Patent No.: US 11,402,331 B2
(45) Date of Patent: Aug. 2, 2022

(54) IMAGING AND MANIPULATION OF BIOLOGICAL SAMPLE

(71) Applicant: City University of Hong Kong, Kowloon (HK)

(72) Inventors: Dong Sun, Kowloon (HK); Wendi Gao, Kowloon (HK)

(73) Assignee: City University of Hong Kong, Kowloon (HK)

( * ) Notice: Subject to any disclaimer, the term of this patent is extended or adjusted under 35 U.S.C. 154(b) by 723 days.

(21) Appl. No.: 16/406,134

(22) Filed: May 8, 2019

(65) Prior Publication Data
US 2020/0355614 A1 Nov. 12, 2020

(51) Int. Cl.
| | |
|---|---|
| *G06T 5/00* | (2006.01) |
| *G01N 21/64* | (2006.01) |
| *B01L 3/02* | (2006.01) |
| *G06T 15/08* | (2011.01) |
| *G06T 7/11* | (2017.01) |

(52) U.S. Cl.
CPC .......... *G01N 21/6458* (2013.01); *B01L 3/021* (2013.01); *G06T 5/002* (2013.01); *G06T 5/003* (2013.01); *G06T 7/11* (2017.01); *G06T 15/08* (2013.01); *G06T 2207/10056* (2013.01); *G06T 2207/10064* (2013.01); *G06T 2207/30024* (2013.01)

(58) Field of Classification Search
CPC ..... G01N 21/6458; B01L 3/021; G06T 5/002; G06T 5/003; G06T 7/11; G06T 15/08; G06T 2207/10056; G06T 2207/10064; G06T 2207/30024; G06T 5/20; G06T 7/149; G06T 7/55; G06T 7/0012; G06T 7/62; G06T 17/00; G06T 2207/10061; G02B 21/26; G02B 21/32; G02B 21/365; C12M 23/16; C12M 35/04; C12M 41/46; C12N 15/89

USPC .......................................................... 435/29
See application file for complete search history.

(56) References Cited

U.S. PATENT DOCUMENTS

| | | | |
|---|---|---|---|
| 6,166,853 | A | 12/2000 | Sapia |
| 7,602,989 | B2 | 10/2009 | Biggs et al. |

(Continued)

FOREIGN PATENT DOCUMENTS

CN 100408668 8/2008

OTHER PUBLICATIONS

Y. Sun et al., "Biological Cell Injection Using an Autonomous MicroRobotic System", Internatinal Journal of Robotics Research, vol. 21, No. 10, pp. 861-868, 2002.
Y. Zhang, et al, "Vision-Servo System for Automated Cell Injection", IEEE Transactions on Industrial Electronics, vol. 56, No. 1, pp. 231-238, 2009.
Q. Zhao, et al, "Robotic Enuleation for Oocytes", 9th IEEE International Conference on Nano/Micro Engineered and Molecular Systems Apr. 13-16, 2014.

(Continued)

*Primary Examiner* — Ali Bayat
(74) *Attorney, Agent, or Firm* — Renner Kenner Greive Bobak Taylor & Weber

(57) ABSTRACT

A system for manipulating a biological sample, and a method for operating such a system. The system includes an imaging device arranged to image a biological sample; a controller operably connected with the imaging device for processing the images obtained by the imaging device; and a tool manipulation device operably connected with the controller and arranged to be connected with a tool for manipulating the biological sample. The controller is arranged to control operation of the tool manipulation device based on the processing of the images.

36 Claims, 14 Drawing Sheets

(56) References Cited

U.S. PATENT DOCUMENTS

| | | | |
|---|---|---|---|
| 7,840,052 B2 | 11/2010 | Zuo et al. | |
| 8,304,240 B2 | 11/2012 | Miyawaki et al. | |
| 10,843,190 B2* | 11/2020 | Bachelet | G01N 21/6458 |
| 2005/0195386 A1* | 9/2005 | Chang | G06K 19/06084 |
| | | | 356/71 |
| 2007/0152130 A1* | 7/2007 | Fomitchov | G02B 21/006 |
| | | | 250/201.3 |
| 2008/0176332 A1* | 7/2008 | Berns | C12M 35/02 |
| | | | 436/55 |
| 2009/0232409 A1* | 9/2009 | Marchesotti | G06T 5/001 |
| | | | 382/254 |
| 2015/0101411 A1* | 4/2015 | Zalev | A61B 5/0095 |
| | | | 73/643 |
| 2015/0110403 A1* | 4/2015 | Cho | G06K 9/6218 |
| | | | 382/195 |
| 2017/0001302 A1* | 1/2017 | Nomura | B25J 7/00 |
| 2017/0205615 A1* | 7/2017 | Vaziri | G02B 21/008 |
| 2017/0333901 A1 | 11/2017 | Sun et al. | |
| 2018/0132962 A1* | 5/2018 | Hasani bidgoli | A61B 90/11 |

OTHER PUBLICATIONS

M. Xie, et al, "Out-of-plane Rotation Control of Biological Cells with a Robot-Tweezers Manipulation System for Orientation-based Cell Surgery", IEEE Transactions on Biomedical Engineering, pp. 1-1, 2018.

A. Shakoor, et al, "A High-Precision Robot-Aided Single-Cell Biopsy System", IEEE International Conference on Robotics and Automation (ICRA) Singapore, pp. 5397-5402, 2017.

W. Richardson, et al, "Bayesian-Based Iterative Method of Image Restoration*", Journal of the Optical Society of America, vol. 62, No. 1, p. 55, 1972.

L. Lucy, "An iterative technique for the rectification of observed distributions", The Astronomical Journal, vol. 79, p. 745, 1974.

S. Hadj, et al., "Restoration Method for Spatially Variant Blurred Images", INRIA, 2011.

M. Arigovindan, et al, "A Parallel Product—Convolution approach for representing the depth varying Point Spread Functions in 3D widefield microscopy based on principal component analysis", Optics Express, vol. 18, No. 7, p. 6461, 2010.

* cited by examiner

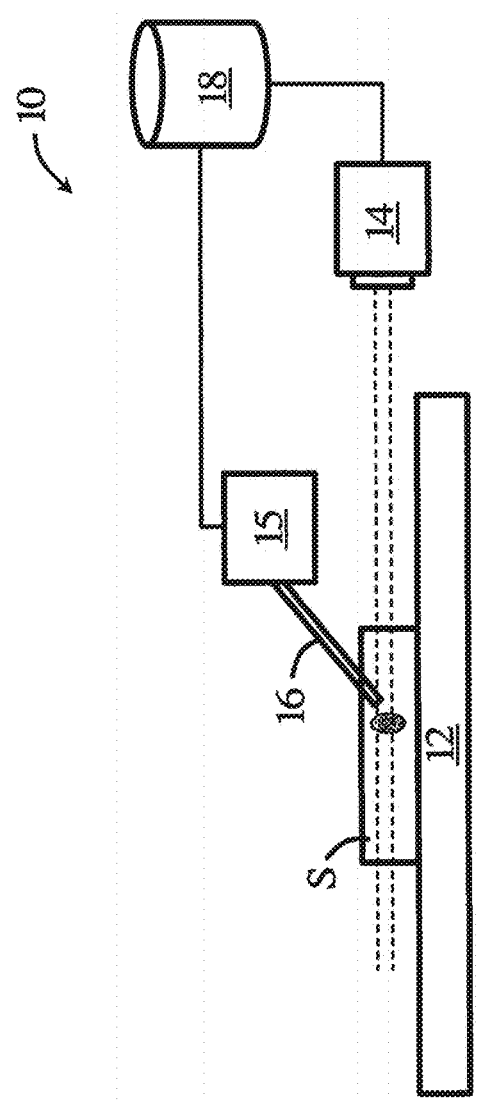

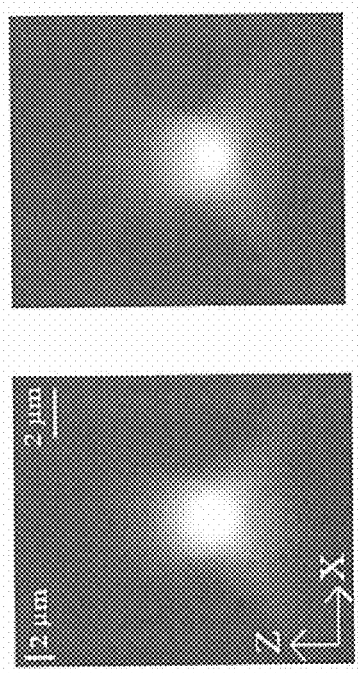
Figure 7A
Figure 7B
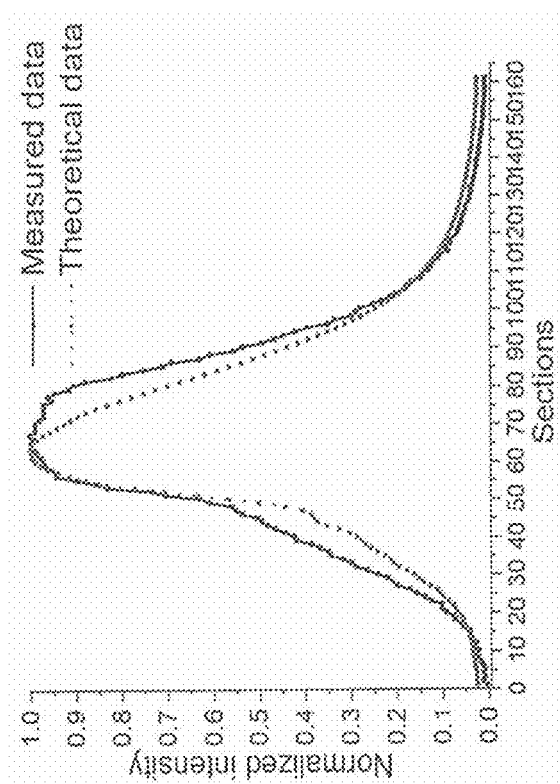
Figure 7C

IMAGING AND MANIPULATION OF BIOLOGICAL SAMPLE

TECHNICAL FIELD

The invention relates to imaging and manipulation of a biological sample. Specifically, and not exclusively, the invention relates to imaging and manipulation of a biological sample based on wide-field fluorescence microscopy.

BACKGROUND

Biomedical imaging systems are commonly used to obtain images or video (frames of images) of biological samples or subjects in research, and in the healthcare field for diagnostic and therapeutic purposes. Some exemplary imaging systems include X-rays systems, CT systems, PET systems, ultrasonic imaging systems; magnetic resonance imaging systems, optical imaging systems, etc. These imaging systems rely on different operation principles to obtain images. Images obtained by these systems are usually processed, analysed, or modified, for improving the quality of the images before the images are presented to the user. Medical practitioners, biomedical researchers, and the like, rely on images produced by these systems for assessing the state of the biological samples or subjects. Thus, the quality, time, and cost associated with processing of these images are of significant practical importance.

SUMMARY OF THE INVENTION

It is an object of the invention to address the above needs, to overcome or substantially ameliorate the above disadvantages or, more generally, to provide improved imaging and reliable in vitro manipulation of a biological sample.

In accordance with a first aspect of the invention, there is provided a system for manipulating a biological sample, including: an imaging device arranged to image a biological sample; a controller operably connected with the imaging device for processing the images obtained by the imaging device; and a tool manipulation device operably connected with the controller and arranged to be connected with a tool for manipulating the biological sample. The controller is arranged to control operation of the tool manipulation device based on the processing of the images. The biological sample may be arranged in a container such as a petri dish, a cover glass, or a microfluidic chip.

In one embodiment of the first aspect, the controller is arranged to control operation of the tool manipulation device to effect movement of the tool relative to the biological sample.

In one embodiment of the first aspect, the tool manipulation device has at least 3 degrees of freedom. The tool manipulation device may have up to 6 degrees of freedom.

In one embodiment of the first aspect, the system also includes a tool connected with the tool manipulation device. The tool may be a micro-tool. The tool may be a manipulation tool, e.g., for intracellular manipulation. More specifically, the tool may be a surgical tool, e.g., for intracellular surgery. For example, the tool may include a micro-pipette, micro-injector, etc.

In one embodiment of the first aspect, the imaging device is part of an imaging apparatus.

In one embodiment of the first aspect, the imaging apparatus includes a support for holding the biological sample, and an objective lens for manipulating light.

In one embodiment of the first aspect, the imaging apparatus further includes movement means for moving one or both of the support and the objective lens to enable relative movement between the support and the objective lens. The movement means may be arranged such that the relative movement is in a vertical direction. The movement means may further allow relative movement in directions (e.g., on a horizontal plane) other than vertical direction. The movement means may include one or more motors.

In one embodiment of the first aspect, the controller is further arranged to control movement of the movement means. The controller may be arranged to control movement of the movement means such that the relative movement is in steps. The steps are preferably of equal distance.

In one embodiment of the first aspect, the controller is arranged to control movement of the movement means such that the support and the objective lens returns to a default position upon completion of the manipulation of the biological sample by the tool.

In one embodiment of the first aspect, the imaging device is a camera. The camera may be a CCD camera, a sCMOS camera, or the like, for obtaining images with optical sections of the biological sample.

In one embodiment of the first aspect, the imaging apparatus includes a microscope. Preferably, the microscope is a fluorescence microscope. More preferably, the microscope is a wide-field fluorescence microscope. The wide-field fluorescence microscope may be an inverted wide-field fluorescence microscope or an upright wide-field fluorescence microscope. The wide-field fluorescence microscope generally includes a light source, dichroic mirror, an excitation filter, an emission filter, and like optical elements, to enable fluorescence imaging.

In one embodiment of the first aspect, the controller is arranged to process the images by: deconvoluting the images for removing noises and blurs in the images; segmenting the deconvoluted images; and reconstructing a 3D model of the biological sample based on the segmented deconvoluted images. Preferably, the imaging apparatus is a wide-field fluorescence microscope, the imaging device is a camera, and the images are fluorescence images.

In accordance with a second aspect of the invention, there is provided a method for processing images of a biological sample, including: deconvoluting the images for removing noises and blurs in the images; segmenting the deconvoluted images; and reconstructing a 3D model of the biological sample based on the segmented deconvoluted images.

In one embodiment of the second aspect, the images are fluorescence images obtained with a fluorescence microscope.

In one embodiment of the second aspect, the deconvolution includes: processing the respective images to determine one or more point spread functions for at each optical sampling depth.

In one embodiment of the second aspect, the deconvolution further includes: retrieving one or more predetermined one or more point spread functions from the controller based on the processing of the respective images.

In one embodiment of the second aspect, the deconvolution further includes: determining deconvolution estimation of the respective images based on the one or more determined point spread functions.

In one embodiment of the second aspect, the deconvolution further includes:
determining noise regularized estimations of the respective images based on the deconvolution estimation of the respective images.

In one embodiment of the second aspect, the determination of the noise regularized estimations is based on a regularization factor.

In one embodiment of the second aspect, the deconvolution further includes: determining whether the noise regularized estimations approaches convergence to determine completion of the deconvolution.

In one embodiment of the second aspect, the deconvolution further includes: processing the images to turn the images into grayscale images prior to determining the point spread functions.

In one embodiment of the second aspect, the segmentation of the deconvoluted images is based on a localized region-based segmentation method or thresholding.

In one embodiment of the second aspect, the segmentation of the deconvoluted images further includes: determining whether the segmentation approaches convergence to determine completion of the segmentation.

In one embodiment of the second aspect, the reconstruction of the 3D model is based on volume rendering.

In accordance with a third aspect of the invention, there is provided a method for operating the system of the first aspect. The method includes moving the biological sample relative to the imaging device (e.g., by moving the sample or the imaging device or both) for obtaining images with optical sections of the biological sample; and imaging the biological sample using the imaging device to obtain images with optical sections of the biological sample In one embodiment of the third aspect, the relative movement is in steps and the imaging device is arranged to image the biological sample at each steps. Preferably, the relative movement is in a vertical direction.

In one embodiment of the third aspect, the method further includes processing the obtained images based on the method of the second aspect.

In one embodiment of the third aspect, the method further includes controlling operation of the tool manipulation device based on the processing of the images. Controlling operation of the tool manipulation device may include effecting movement of the tool relative to the biological sample. The movement of the tool may be in 1D, 2D, or 3D.

In one embodiment of the third aspect, the method further includes manipulating the biological sample using the tool. For example, the tool may be arranged to perform surgical operations on the biological samples.

In one embodiment of the third aspect, the imaging apparatus further includes a support for holding the biological sample, an objective lens, and movement means for moving one or both of a support and the objective lens to enable relative movement between the support and the objective lens; and the method further includes returning the support and the objective lens return to a default position upon completion of the manipulation of the biological sample by the tool.

In accordance with a fourth aspect of the invention, there is provided a system for processing images of a biological sample. The system includes one or more processors for: deconvoluting the images for removing noises and blurs in the images; segmenting the deconvoluted images; and reconstructing a 3D model of the biological sample based on the segmented deconvoluted images.

In one embodiment of the fourth aspect, the images are fluorescence images obtained with a fluorescence microscope.

In one embodiment of the fourth aspect, the one or more processors are arranged to perform deconvolution by: processing the respective images to determine one or more point spread functions for at each optical sampling depth.

In one embodiment of the fourth aspect, the one or more processors are arranged to perform deconvolution by: retrieving one or more predetermined point spread functions from the controller based on the processing of the respective images.

In one embodiment of the fourth aspect, the one or more processors are arranged to perform deconvolution by: determining deconvolution estimation of the respective images based on the one or more determined point spread functions.

In one embodiment of the fourth aspect, the one or more processors are arranged to perform deconvolution by: determining noise regularized estimations of the respective images based on the deconvolution estimation of the respective images.

In one embodiment of the fourth aspect, the one or more processors are arranged to determine the noise regularized estimations based on a regularization factor.

In one embodiment of the fourth aspect, the one or more processors are arranged to determine whether the noise regularized estimations approaches convergence to determine completion of the deconvolution.

In one embodiment of the fourth aspect, the one or more processors are arranged to perform deconvolution by: processing the images to turn the images into grayscale images prior to determining the point spread functions.

In one embodiment of the fourth aspect, the one or more processors are arranged to perform segmentation of the deconvoluted images based on a localized region-based segmentation method or thresholding.

In one embodiment of the fourth aspect, the one or more processors are arranged to perform segmentation by: determining whether the segmentation approaches convergence to determine completion of the segmentation.

In one embodiment of the fourth aspect, the one or more processors are arranged to reconstruct the 3D model based on volume rendering.

In one embodiment of the fifth aspect, the one or more processors are arranged to analyze the reconstructed 3D model to determine optimal operation position for subsequent manipulation task(s).

In accordance with a fifth aspect of the invention, there is provided a system for intracellular manipulation of a biological sample, the system being the system of the first aspect. The system may be a surgical system.

The systems and methods in the above aspects are particularly suitable for imaging and manipulation of a biological sample based on wide-field fluorescence microscopy.

BRIEF DESCRIPTION OF THE DRAWINGS

Embodiments of the invention will now be described, by way of example, with reference to the accompanying drawings in which:

FIG. 1A is a schematic diagram of a system for manipulating a biological sample in one embodiment of the invention;

FIG. 7A is an image of an XZ plane of a microsphere tested using the system of FIG. 1B;

FIG. 7B is a theoretical image of an XZ plane of a microsphere;

FIG. 7C is a graph showing the normalized intensity of the central line in the images of FIGS. 7A and 7B;

DETAILED DESCRIPTION OF THE PREFERRED EMBODIMENT

Figure 1B:
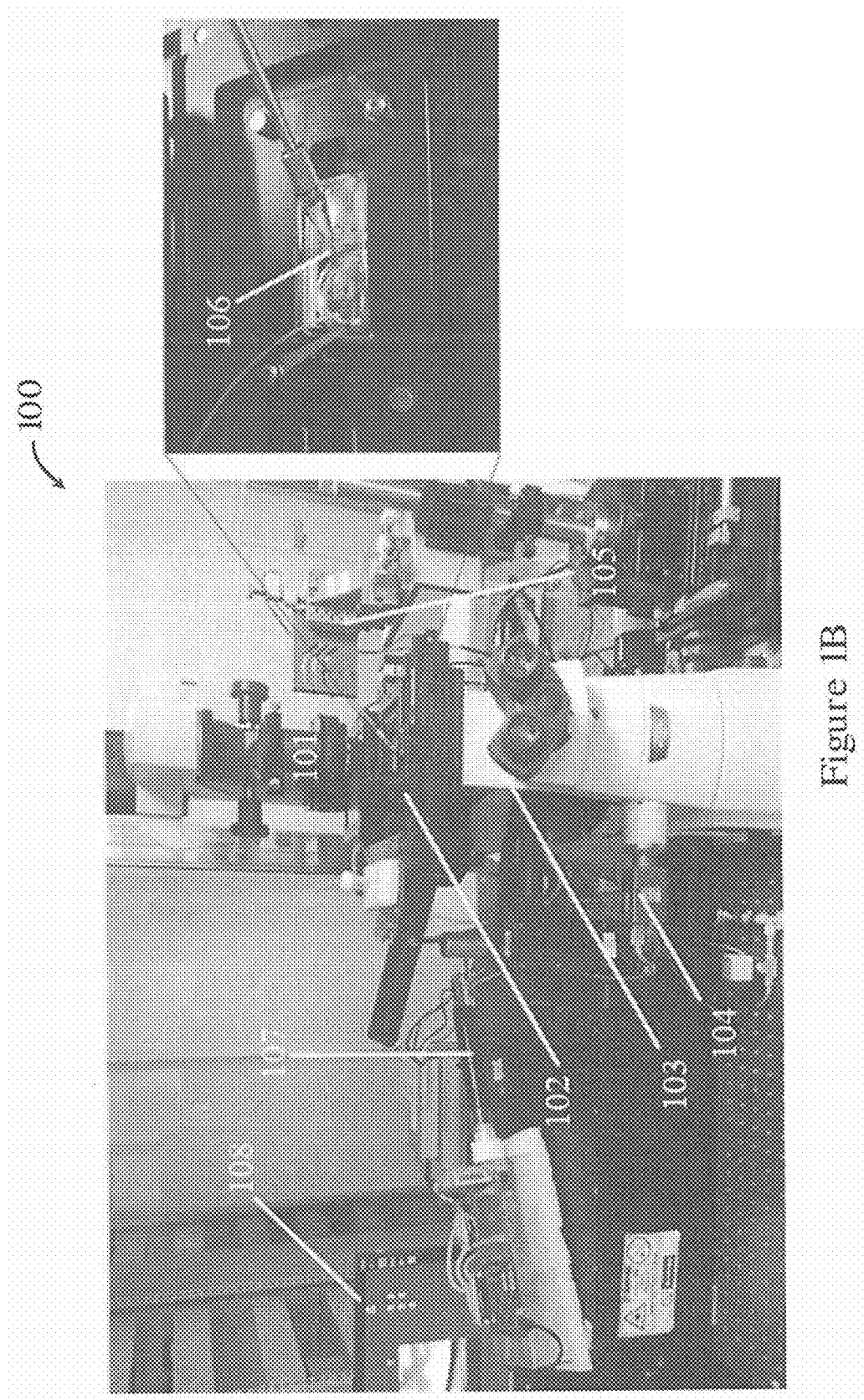
FIG. 1B is a picture showing a system for manipulating a biological sample in one embodiment of the invention.

Referring to FIG. 1A, there is shown a system m for manipulating a biological sample S in one embodiment of the invention. The biological sample S may include a cell, cell culture, solution, etc. The system m includes an imaging device 14 arranged to image a biological sample S placed in a container supported on a support 12. In one embodiment, the imaging device 14 is a camera, such as a CCD camera, a sCMOS camera, or the like, for obtaining images with optical sections of the biological sample S.

The imaging device 14 may be part of an imaging apparatus (not shown, except for imaging device 14). In one embodiment, the imaging apparatus includes a microscope. Preferably, the microscope is a fluorescence microscope, and more preferably, a wide-field fluorescence microscope. The wide-field fluorescence microscope may be an inverted wide-field fluorescence microscope or an upright wide-field fluorescence microscope. The wide-field fluorescence microscope generally includes a light source, dichroic mirror, an excitation filter, an emission filter, and like optical elements, to enable fluorescence imaging. The imaging apparatus may also include the support 12 for holding the biological sample S, and an objective lens for manipulating light. Movement means, such as one or more motors, may be provided for moving one or both of the support 12 and the objective lens to enable relative movement between the support 12 and the objective lens. The movement means may be arranged such that the relative movement is in a vertical direction. Alternatively or additionally, the movement means may further allow relative movement in directions (e.g., on a horizontal plane) other than vertical direction.

A controller 18 is operably connected with the imaging device 14. The controller 18 is arranged for processing the images obtained by the imaging device 14, and for controlling operation of the tool manipulation device 15 based on the processing of the images. In one embodiment, the controller is arranged to control operation of the tool manipulation device 15 to effect movement of the tool 16 relative to the biological sample S. The controller 18 may be further arranged to control movement of the movement means, for example, to provide the relative movement in steps. The controller 18 may be further arranged to control movement of the movement means such that the support 12 and the objective lens returns to a default position upon completion of the manipulation of the biological sample S by the tool 16. In one embodiment, the controller is arranged to process the images by deconvoluting the images for removing noises and blurs in the images; segmenting the deconvoluted images; and reconstructing a 3D model of the biological sample based on the segmented deconvoluted images The controller may further analyze the reconstructed 3D model to determine optimal operation position for subsequent manipulation task(s).

The system 10 also has a tool manipulation device 15 operably connected with the controller and arranged to be connected with a tool for manipulating the biological sample. The tool manipulation device 15 is controlled to move by the controller. The tool manipulation device 15 may have at least 3 degrees of freedom, and up to 6 degrees of freedom. The movement of the tool 16 (by the device 15) may be in 1D (along a single direction), 2D (in a plane), or 3D (in a 3D space). The tool 16 connected with the tool manipulation device 15 may be a micro-tool. The tool 16 may be a manipulation tool for intracellular manipulation. More specifically, the tool 16 may be a surgical tool for intracellular surgery. For example, the tool 16 may include a micro-pipette, micro-injector, micro-tweezer, etc.

FIG. 1B shows a system 100 for manipulating a biological sample in one embodiment of the invention. The system 100 can be called a "robot-aided wide field fluorescence microscopy system". As shown in FIG. 1B, the system 100 includes an inverted wide field fluorescence microscope 101 with a movable (e.g., motorized) support platform 102 for supporting a biological sample. The microscope 101 also includes a movable objective lens 103. A CCD camera 104 is operably connected with the microscope 101 and the computer (processor) 108. A manipulator 105 is assembled with a micro-pipette 106 and a micro-injector 107 for cell surgeries. The computer 108 is operably connected with the microscope 101 and the manipulator 105 for controlling their operation.

In operation, the biological sample may be placed inside a container, such as a petri dish or a cover glass, or the biological sample may be immobilized by a microfluidic chip. Then, the container is placed on the movable (e.g., motorized) support platform 102. The computer 108 controls one or both of the movable objective lens 103 or the movable (e.g., motorized) support platform 102 along a vertical axis (Z axis) with vertical steps (step size $\Delta z$) for imaging the entire biological sample (e.g., from bottom to top, from top to bottom, etc.). The CCD camera 104 images the biological sample at each step. Then the computer 108 processes the images containing optical sections of the sample to reconstruct a 3D model of the biological sample (or an ROI) on the computer 108 for display. The computer 108 then analyzes the reconstructed results and provides the manipulator 105 with 3D information feedback, to control movement and operation of the manipulator 105 hence the tools 106 connected to the manipulator 105. In this embodiment, the manipulator 105 moves the micro-pipette 106 into the optimal position (a position for manipulation) based on the feedback from computer 108. The computer 108 then controls the micro-injector 107 to start offer pressure for surgical operations.

Figure 2:
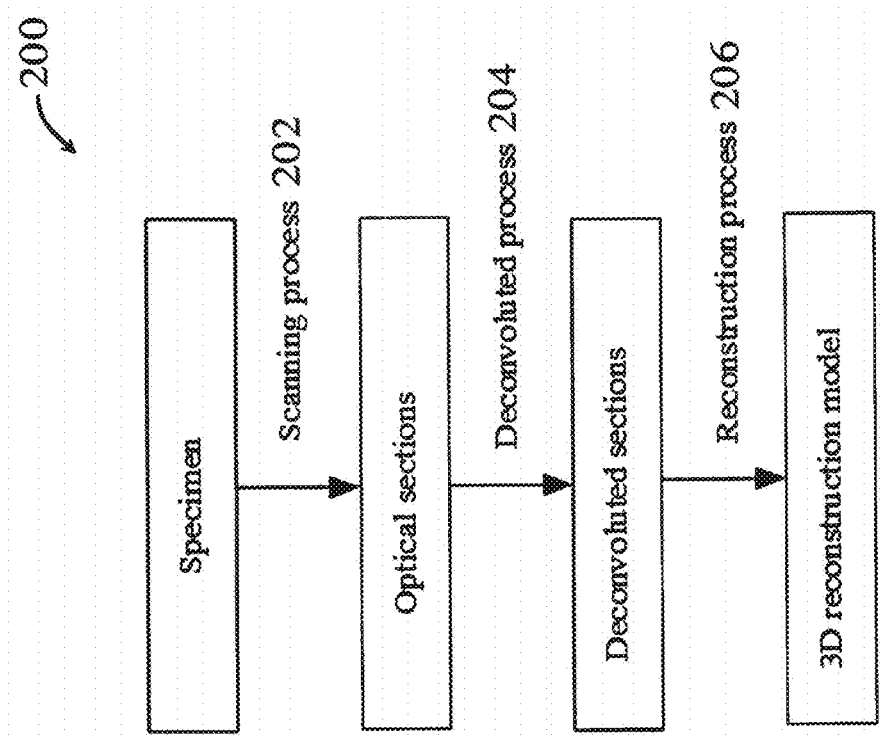
FIG. 2 is a flowchart showing a method for imaging and processing a biological sample in one embodiment of the invention.

FIG. 2 shows a general method 200 for imaging and processing a biological sample in one embodiment of the invention. The method 200 in FIG. 2 can be performed using the systems 10, 100 of FIGS. 1A and 1B. As shown in FIG. 2, the biological sample is optically imaged in a scanning process 202, e.g., using the imaging method described above with respect to FIG. 1B. A series of images of optical sections of the biological sample are obtained. Afterwards, the optical sections are deconvoluted to reduce or eliminate blurs and noises through a deconvolution process 204. After deconvolution, the method 200 proceeds to a reconstruction process 206, in which the deconvoluted sections are segmented to obtain clear boundary, and are reconstructed into a 3D model. The detailed descriptions of these processes are illustrated below.

Figure 3:
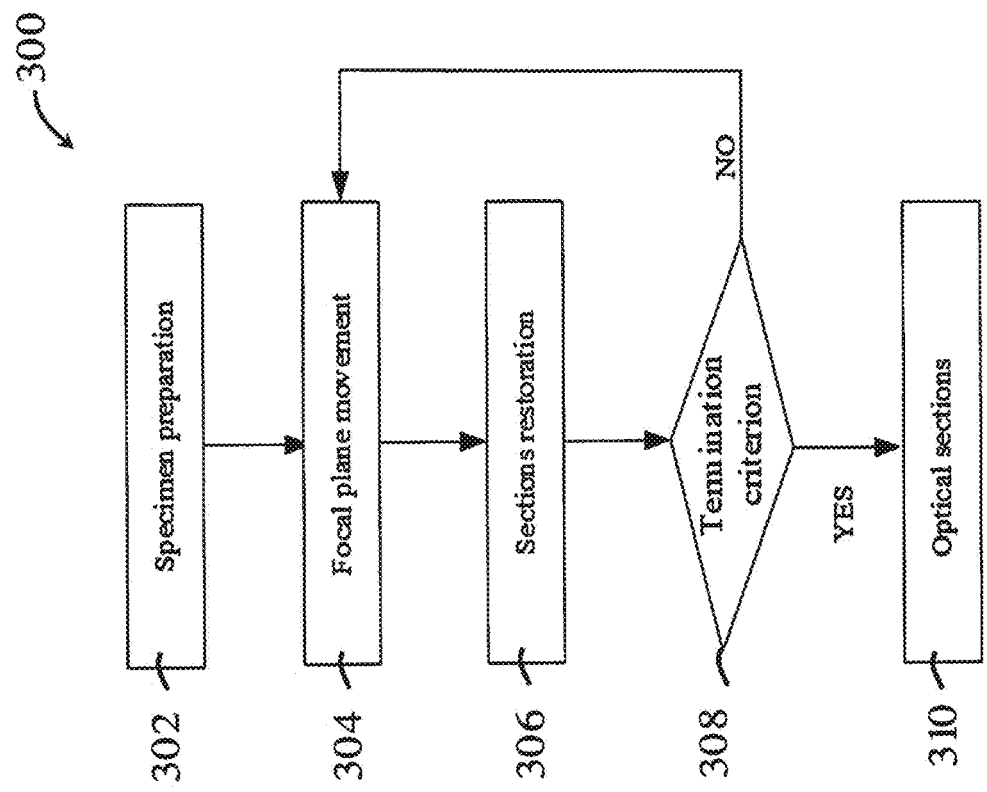
FIG. 3 is a flowchart showing the scanning process in the method of FIG. 2.

FIG. 3 is a flowchart showing the scanning process 300 in the method 200 of FIG. 2. In the scanning process 300, in step 302, the biological sample is first positioned on the movable support platform 102. Then, in step 304, the focal plane moves with a step size. The focal plane movement may be achieved by moving the objective lens 103 or the movable support platform 102 along a vertical direction. The focal plane movement starts from a certain height, and it may be from the bottom of the biological sample to the top. After each movement, the focal plane may wait a holding time for obtaining a clear image. The holding time after each movement may be larger than the exposure time of the light adopted during observation. Then, in step 306, the computer 108 may restore the optical sections from CCD camera 104. In step 308, a determination is made as to whether the termination criterion of the optical sections meets a predetermined requirement such that the scanning process 300 can be completed. In one example, the terminate criterion is judged by the amount of the optical sections (e.g., whether a predetermined number is reached). If it is determined that the terminate criterion is satisfied, then the scanning completes. Otherwise, the focal plane may moves into another height and repeat steps 304 to 308. The step size, holding time, exposure time and the amount of optical sections may be controlled by or in the computer 108.

Figure 4:
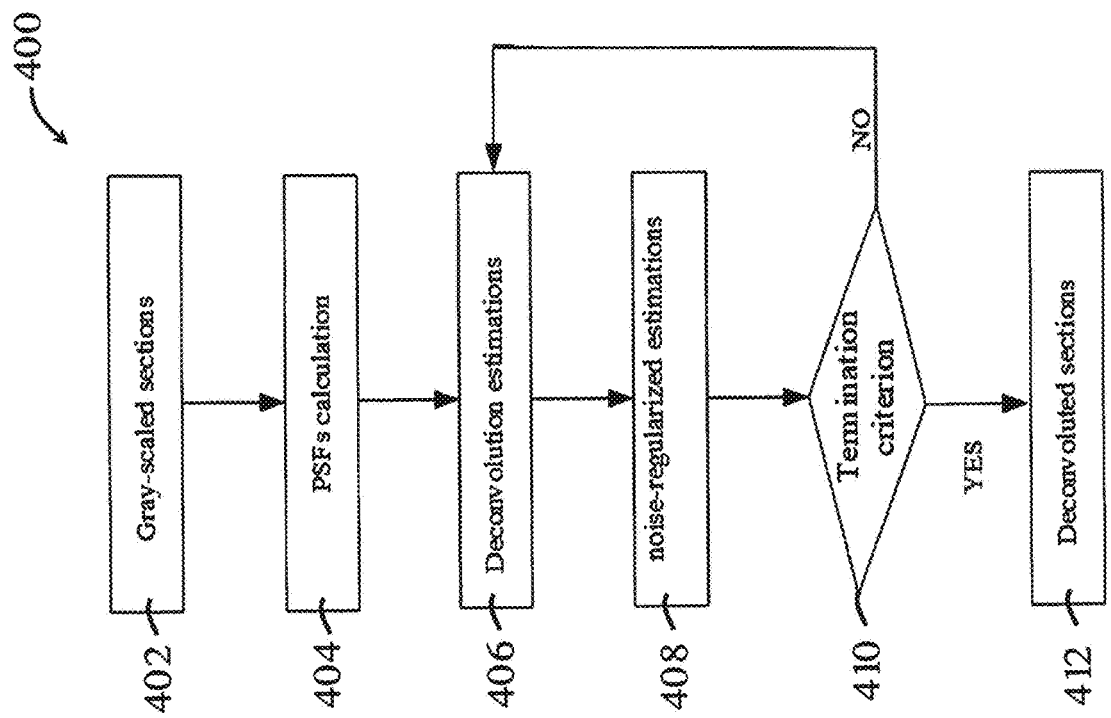
FIG. 4 is a flowchart showing the deconvolution process in the method of FIG. 2.

FIG. 4 is a flowchart showing the deconvolution process 400 in the method 200 of FIG. 2. In the deconvolution process 400, in step 402, the optical sections are turned into grayscale sections. Then, in step 404, multiple point spread functions (PSF) are obtained at each optical sampling depth. As each optical section combines sharp in-focus features with blurred features from out-of-focus planes and noises, these optical behavior can be expressed by PSF. Ideally, the grayscale sections can be expressed as $g(x_i,y_i,z_i)$, which is a convolution of PSF functions and biological sample and is given as follows:

$$g(x_i, y_i, z_i) = \sum_s \sum_{(x_o, y_o)} h_s(x_i - x_o, y_i - y_o, z_i - z_o) f(x_o, y_o, z_o)$$

where $(x_i,y_i,z_i)$ is the selected point on the focal plane of the image space, $(x_o,y_o,z_o)$ is the selected light source point of the object space, $g(x_i,y_i,z_i)$ is the pixel intensity value of the corresponding focal point from the CCD camera, $f(x_o,y_o,z_o)$ is the intensity value of biological sample, $h_s(x_i-x_o,y_i-y_o, z_i-z_o)$ is a PSF describing the projection behavior on point $(x_i,y_i,z_i)$, and subscript s means that PSF is calculated on the plane where the source point $(x_o,y_o,z_o)$ lies in.

The PSFs may be obtained by experimental measurement and/or theoretical calculation. Preferably, PSFs may be calculated based on Gibson-Lani model illustrated in S. Gibson et al., *"Experimental test of an analytical model of aberration in an oil-immersion objective lens used in three-dimensional light microscopy"*, J. Opt. Soc. America A, vol. 8, no. 10, p. 1601, 1991. The PSF function $h_s$ may be expressed as:

$$h_s = \left| A \int_0^1 e^{iOPD} J_0\left(\frac{2\pi}{\lambda} \sqrt{(x_i - x_o)^2 + (y_i - y_o)^2}\, NAp\right) p\, dp \right|^2$$

where A is a constant complex amplitude; OPD (optical path difference) is the space-variant parameter showing the trajectory difference between ideal and actual light rays; NA is the numerical aperture; $\lambda$ is emission light wavelength and $J_0$ is the Bessel function of the first kind of order zero. In PSF calculation, the depth interval between two optical sections, $d_z$, may be equal to the size of lens movement $\Delta z$ because of the geometric distortion from the difference among the refractive indices of layers that focal light passes through. It can be expressed as $d_z = k\Delta z$, k is a constant showing the refractive indices difference.

In one embodiment, e.g., for a certain biological sample and system 100, most parameters of PSF can be fixed or predetermined. These parameters include the numerical aperture NA, the refractive indices of the biological sample, depth interval $d_z$ and so on. Multiple PSFs may be obtained in advance and stored in computer 108. In this way, the computation time of deconvolution process 400 can be reduced.

Referring to FIG. 4, in step 406, the calculated PSFs are adopted in the deconvolution algorithm. Preferably, deconvolution methods based on maximum likelihood estimation method illustrated in J. Sibarita. *"Deconvolution microscopy"* in *Microscopy Techniques*. Berlin, Germany: Springer, 2005, pp. 201-243 may be used. The interactive equation of restored sections may be expressed as:

$$\hat{f}^{k+1}(x_o, y_o, z_o) =$$
$$\frac{\hat{f}^k(x_o, y_o, z_o)}{H(x_o, y_o, z_o)} \sum_{(x_o, y_o, z_o)} h_s(x_i - x_o, y_i - y_o, z_i - z_o) \frac{g(x_i, y_i, z_i)}{\hat{g}^k(x_i, y_i, z_i)}$$

$$\hat{g}^k(x_i, y_i, z_i) = \sum_{z_o} \sum_{(x_o, y_o)} h_s(x_i - x_o, y_i - y_o, z_i - z_o) \hat{f}^k(x_o, y_o, z_o)$$

$$H(x_o, y_o, z_o) = \sum_s \sum_{(x_i, y_i, z_i)} h_s(x_i - x_o, y_i - y_o, z_i - z_o)$$

where $\hat{f}^{k+1}(x_o,y_o,z_o)$ is the deconvolution estimations of biological sample at the (k+1)th interaction, $\hat{g}^k(x_i,y_i,z_i)$ is the sample mean of Poisson distribution at the (k+1)th interaction, and $H(x_o,y_o,z_o)$ is an energy conservation constant.

Also, the optical sections are usually corrupted by noises at different levels. Step 406 may amplify these noises and thus generates artifacts during interactions. Preferably, estimation of biological sample $\hat{f}^{k+1}(x_o,y_o,z_o)$ may be regularized in step 408. Preferably, a Conchello's intensity function illustrated in J. Conchello et al., "*Fast regularization technique for expectation maximization algorithm for optical sectioning microscopy*", *Three-Dimensional Microscopy: Image Acquisition and Processing III*, 1996 may be used to alleviate this problem. An interactive form of the noise-regularized estimations of biological sample can be expressed as $$\hat{f}_R^{k+1}(x_o, y_o, z_o) = \frac{-1 + \sqrt{1 - 8\alpha \hat{f}^{k+1}(x_o,y_o, z_o)}}{4\alpha}$$

where $\hat{f}_R^{k+1}(x_o,y_o,z_o)$ is the noise-regularized estimations of biological sample at the (k+1)th interaction, $\alpha$ is the regulation factor.

In one embodiment, the optimal regulation factor $\alpha$ may be set in terms of experimental measurement of specific biological samples, such as fluorescent microspheres. The optimal regulation factor $\alpha$ may be the value having best deconvolution performance.

Once $\hat{f}_R^{k+1}(x_o,y_o,z_o)$ is obtained, step 410 is activated to determine whether the interaction approaches convergence. Preferably, a normalized mean square error (NMSE) between last two interactive estimations may be used for this purpose. The NMSE can be expressed as:

$$NMSE = \frac{\left\| \hat{f}_R^{k+1}(x_o, y_o, z_o) - \hat{f}_R^k(x_o, y_o, z_o) \right\|^2}{\left\| \hat{f}_R^k(x_o, y_o, z_o) \right\|^2}$$

If the NMSE between two interactions are constant, or substantially constant, the deconvolution process 400 ends in step 412, in which the deconvoluted sections should be the result of step 408. Otherwise, the noise regulated estimation $\hat{f}_R^{k+1}(x_o,y_o,z_o)$ is putted into steps 406 to get a new estimation $\hat{f}^{k+2}(x_o,y_o,z_o)$ and $\hat{f}_R^{k+2}(x_o,y_o,z_o)$ for the next interaction. Alternatively, in step 410, the determination of whether the deconvolution process 400 should end may be based on predetermined number of interactions.

Figure 5:
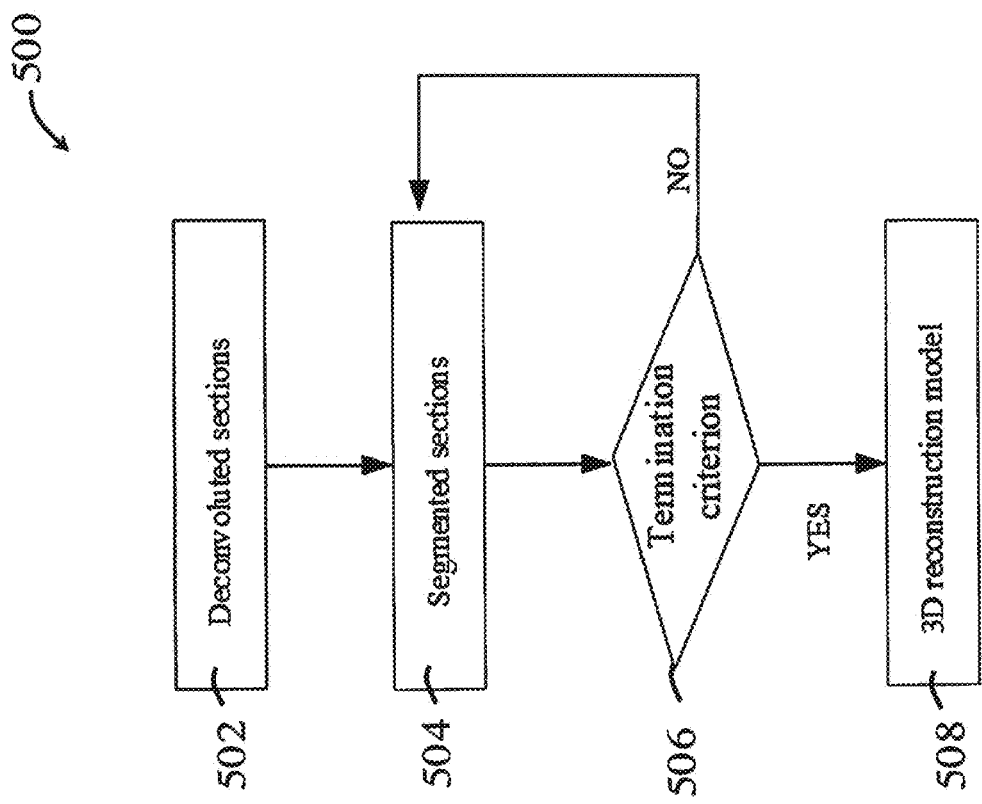
FIG. 5 is a flowchart showing the reconstruction process in the method of FIG. 2.

FIG. 5 is a flowchart showing the reconstruction process 500 in the method 200 of FIG. 2. In the reconstruction process 500, in step 502, the deconvoluted sections are processed using a segmentation algorithm to obtain clear boundary. Preferably, a localized region-based segmentation algorithm illustrated in S. Lankton et al., "*Localizing Region-Based Active Contours*", *IEEE Trans. Image Processing*, vol. 17, no. 11, pp. 2029-2039, 2008 may be used. The movement of contour can be expressed as $$\frac{\partial \psi(x_o, y_o)}{\partial n} = \partial I(\psi(x_o, y_o)) \sum_{(x_a,y_a)} \left[ M(x_o, y_o, x_a, y_a) \frac{\partial F(\hat{f}_R(x_a, y_a), \psi((x_a, y_a))}{\partial \psi} \right] + \lambda \partial I(\psi(x_o, y_o)) \nabla \left( \frac{\nabla \psi(x_o, y_o)}{|\nabla \psi(x_o, y_o)|} \right)$$

where $I(\psi)$ is the interior of contour $\psi$, $\partial I(\psi)$ is the derivative of $I(\psi)$ with respect to $\psi$, n is the interaction number, mask $M(x_o,y_o,x_a,y_a)$ is used to define the narrow gap containing point $(x_a,y_a)$ near contour $\psi$, and $F(\hat{f}_R(x_a,y_a), \psi(x_a,y_a))$ is a force function calculated at point $(x_a,y_a)$ with the deconvoluted sections $\hat{f}_R(x_a,y_a)$ and contour function value $\psi(x_a,y_a)$. For each segmentation, the grayscale values inside boundary of each section can be set to 255.

Once the segmented sections are obtained in step 504 as described, in step 506, the method 500 then determines whether the interaction approaches convergence. Preferably, NMSE between the last two interactive estimations may be used for such purpose. Then, in step 508, the segmented sections are reconstructed into 3D model. Preferably, the reconstruction in step 508 may be based on volume rendering. In one embodiment, the step 506, the determination may instead be based on whether a predetermined number of interactions has been exceeded. As an alternative, the segmentation step 504 may be replaced by setting a threshold value. E.g., in each section, points below such value are set to be 0 while points above it are 255.

Figure 6:
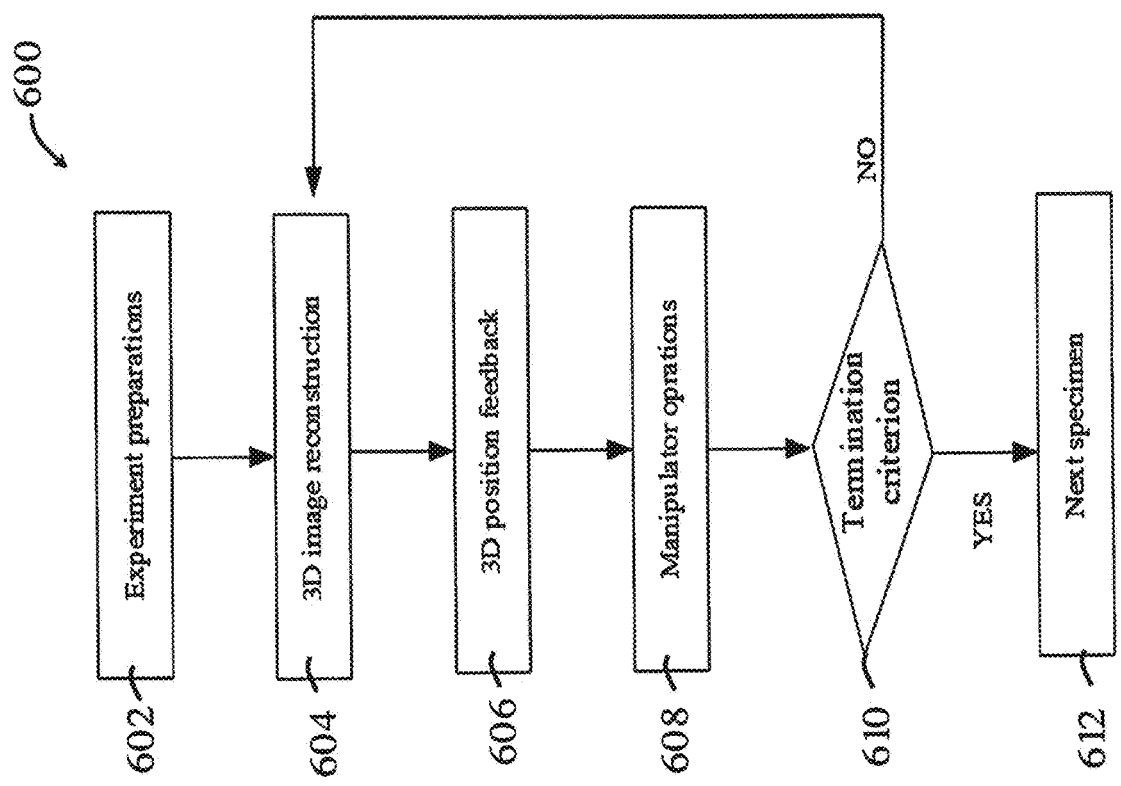
FIG. 6 is a flowchart showing a method for manipulating a biological sample in one embodiment of the invention.

FIG. 6 is a flowchart showing a method 600 for manipulating a biological sample in one embodiment of the invention. The method 600 of FIG. 6 may follow from or be based on any or any parts of the methods 200-500 in FIGS. 2 to 5. As shown in FIG. 6, in step 602, the biological sample is positioned in the movable support platform 102 firstly. Afterwards, the height of micro-pipette 106 or other micro-tools is adjusted to the same plane where focal plane lies (preferably, the bottom plane of the biological sample), and the corresponding 3D position is recorded. In the step 604, the 3D model of the biological sample is reconstructed using the methods 200-500 in FIGS. 2 to 5. Afterwards, the computer 108 may analyze the 3D reconstruction model and provide the optimal operation position for the certain surgery task in step 606. Later, in step 608, the focal plane may focus to such height and the micromanipulator may move the micro-pipette 106 or other micro-tools to such position to perform the task. After the task is performed, the micro-pipette 106 returns to the original position. After that, in step 610, it is determined whether the task is successfully completed. If so, the method may proceed to step 612 to repeat the process 600 on another biological sample. If not, the biological sample may be reconstructed again, or further manipulation operation may be performed.

In the method 600 of FIG. 6, the biological sample may be placed inside a container, such as a petri dish or a cover glass. Alternatively, the biological sample may be immobilized by a microfluidic chip. In one embodiment, the focal plane movement may be achieved by moving objective lens or movable support platform along the vertical axis. In a preferred embodiment, in order to scan the fluorescent biological sample, white light of the microscope 101 may be switched off while fluorescence light may be switched on during scanning process. White light may be turned on and fluorescence light may be turned off after scanning process. In one embodiment, the optical sections may be cropped into small-sized images after scanning process to reduce processing complexity (time and cost). The size and the location of the cropped sections may be set in the computer 108. The central part of the biological sample is an ideal position for manipulation, but other parts of the biological sample can also be manipulated. In one embodiment, the termination criterion of step 610 may instead be based on the manipulation task such as the surgery tasks. For example, the existence of the organelles insides the micro-tools may be the criterion for organelles extraction operations.

Experiments were performed using the system of FIG. 1B based on the methods 200-500 of FIGS. 2 to 5 to reconstruct of fluorescent microspheres as one example. In this example, fluorescent microspheres (TetraSpec, T-14792) with a 4 μm diameter were used to test the accuracy of the system of FIG. 1B. In the experiment, the objective lens 103 with 60× magnification was immersed in water. The resolution of the CCD camera 104 was 640×480 pixels, and the size of each pixel on the CCD camera 104 was 0.123 μm. The depth interval $d_z$ of two focal planes was 0.2 μm. The microspheres were mounted on a slide and fixed with optical cement with a refractive index of 1.57. The refractive index of the cover glass was 1.52, and its thickness was 0.17 mm. Filter GFP was selected, and the emission wavelength of the microspheres was 515 nm. A total of 161 sections were optically sectioned using the system 100.

FIGS. 7A and 7B show the results of the center area with a dimension of 100×100 pixels in each section. FIG. 7A shows the XZ plane of the tested microsphere, and FIG. 7B shows the XZ plane of theoretical blurred sections without adding any noises. In the theoretical calculation, an ellipse with a lateral diameter of 32 pixels and a vertical diameter of 20 pixels was generated on a 100×100×161 pixel space and centred at point (51, 51, 81). 161 PSFs were computed with a depth interval of 0.2 μm from the bottom to the top of the ellipse and the parameters are listed in Table I. Theoretical blurred sections were generated using the above described model. FIG. 7C illustrates the normalized intensity of the central line in the image in FIGS. 7A and 7B. The NMSE among the 161 theoretical and measured sections was 0.036, indicating that the theoretical calculation is in good agreement with the measured results.

TABLE I

PARAMETERS OF PSFs

| Symbol | Name | VALUE |
| --- | --- | --- |
| $n_i$ | refractive index of the lens immersion medium | 1.33 |
| $n_c$ | refractive index of the coverslip | 1.52 |
| $n_s$ | refractive index of the specimen | 1.57 |
| $t_i$ | thickness of the lens immersion medium | 0.160 μm |
| $t_c$ | thickness of the coverslip | 0.170 μm |
| NA | numerical aperture | 1.2 |
| λ | wavelength | 0.515 μm |
| N | number of PSFs | 64 |
|  | dimension | 100 × 100 × 161 |
|  | voxel size | 0.123 μm |
| $d_z$ | thickness interval | 0.2 μm |

Figure 7D:
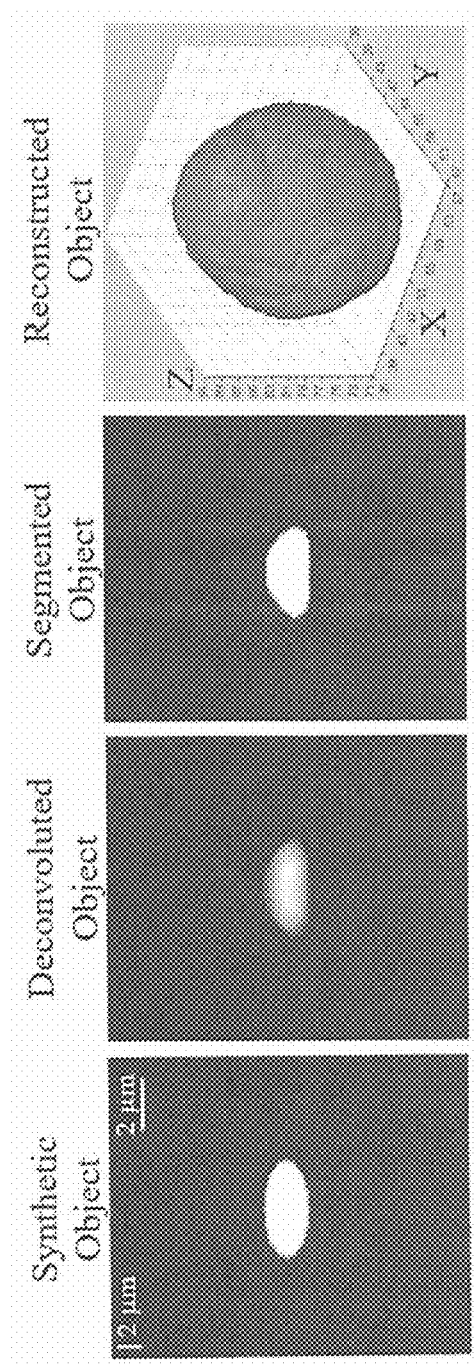
FIG. 7D is a series of images showing the processing of an image using the method of FIG. 2.
Figure 7E:
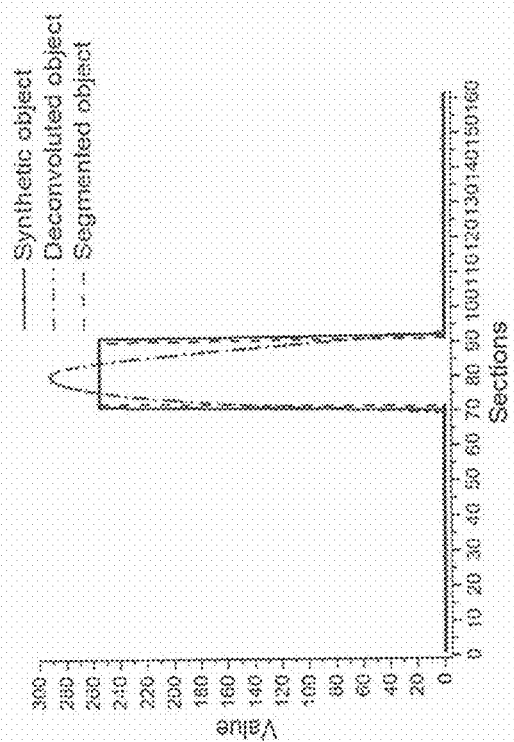
FIG. 7E is a graph showing the central line intensity of the three images in FIG. 7D.

The measured sections were also deconvoluted using a noise regulation factor α of 0.00008. FIG. 7D illustrates a comparison of the deconvoluted, segmented, and synthetic objects, while FIG. 7E presents the central line intensity of the three XZ plane images. The blur details around the microsphere were eliminated after deconvolution. The NMSE between the deconvoluted object and synthetic microsphere was 0.247. In addition, most errors were observed in the lateral dimension because the shape of the tested sample was not a perfect sphere with a diameter of 4 μm, and its fluorescence was not uniform. The error pixel ratio of the reconstructed microsphere, as shown in FIG. 7E was 0.0975%. These results demonstrate the accuracy of the above described system and method embodiments. The results can be used to calibrate the PSFs of the system, which improves the system's ability to provide 3D reconstructed position information for intracellular surgery.

Experiment were also performed using the system of FIG. 1B based on the methods 200-600 of FIGS. 2 to 6 to image and extract mitochondria from a cell sample. In this experiment, human leukaemia monocytic cells (THP-1) with an average radius of 10 μm were used. The mitochondria were dyed by JC-1 (Invitrogen, Mitochondrial Membrane Potential Probe) with an emission wavelength of 590 nm. The THP-1 cells were trapped in a microfluidic chip. The thickness and refractive indices of the cover glass (ISOLAB, 100 Deckglaser) where the THP-1 cells and microfluidic chip lie were 0.17 and 1.59 mm, respectively. A total of 50 sections were sampled with a depth interval of 0.2 μm.

Figure 8A:
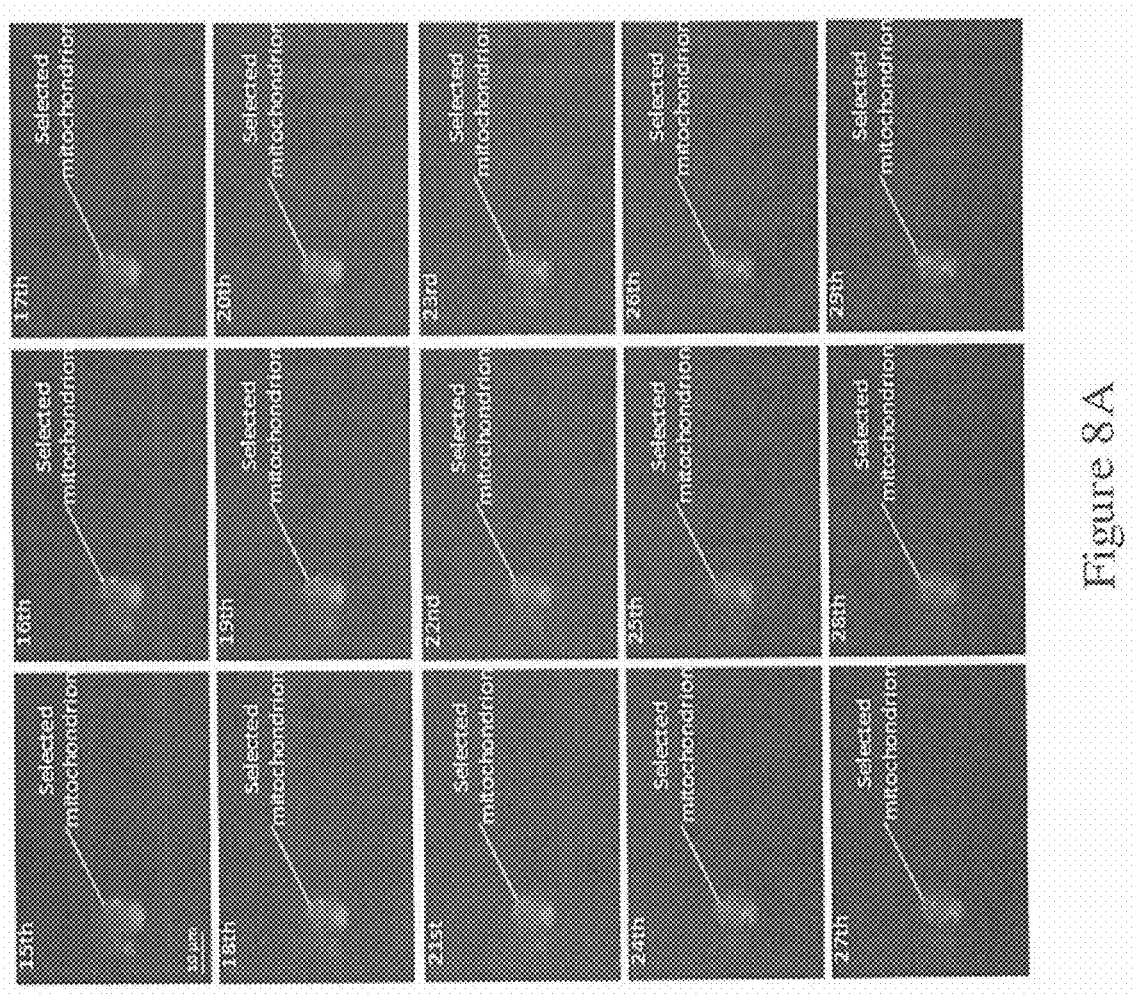
FIG. 8A is a series of images obtained in a mitochondria extraction experiment using the system of FIG. 1B, where the images are 15 sampled sections that were suspected to contain a selected mitochondrion.

FIG. 8A shows 15 sampled sections that were suspected to contain the selected mitochondrion. A 30×30 pixel area containing the selected mitochondrion of all sampled sections was cropped in advance and reconstructed.

Figure 8B:
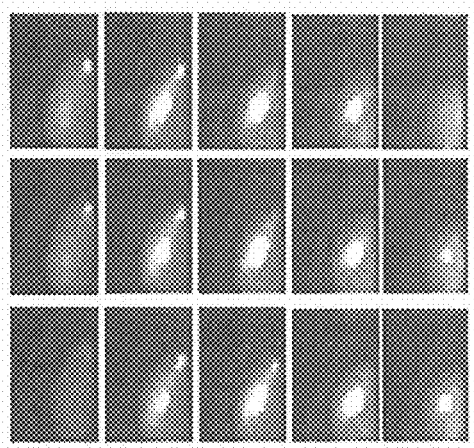
FIG. 8B shows the series of images in FIG. 8A in grayscale.
Figure 8C:
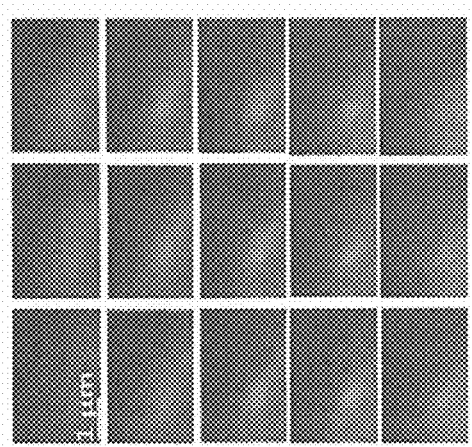
FIG. 8C shows the series of images of FIG. 8B after deconvolution using the method of FIG. 4.
Figure 8E:
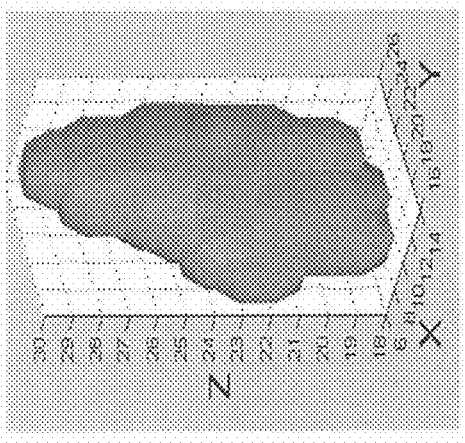
FIG. 8E shows the reconstructed 3D model of the image of FIG. 8D using the method of FIG. 6.
Figure 8D:
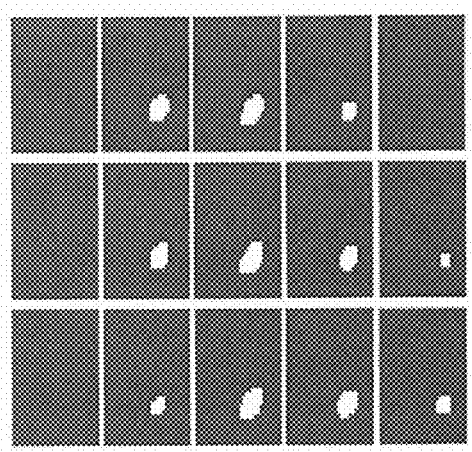
FIG. 8D shows the series of images of FIG. 8C after segmentation using the method of FIG. 5.

FIG. 8B to 8E displays the results of each process. Specifically, FIG. 8B shows the grayscale images of optical sections, FIG. 8C presents the deconvolution sections after 500 interactions, FIG. 8D illustrates the segmentation process (the selected mitochondrion appeared from the 18th to the 29th section), and FIG. 8E displays the reconstructed 3D model of the selected mitochondrion.

Figure 8F:
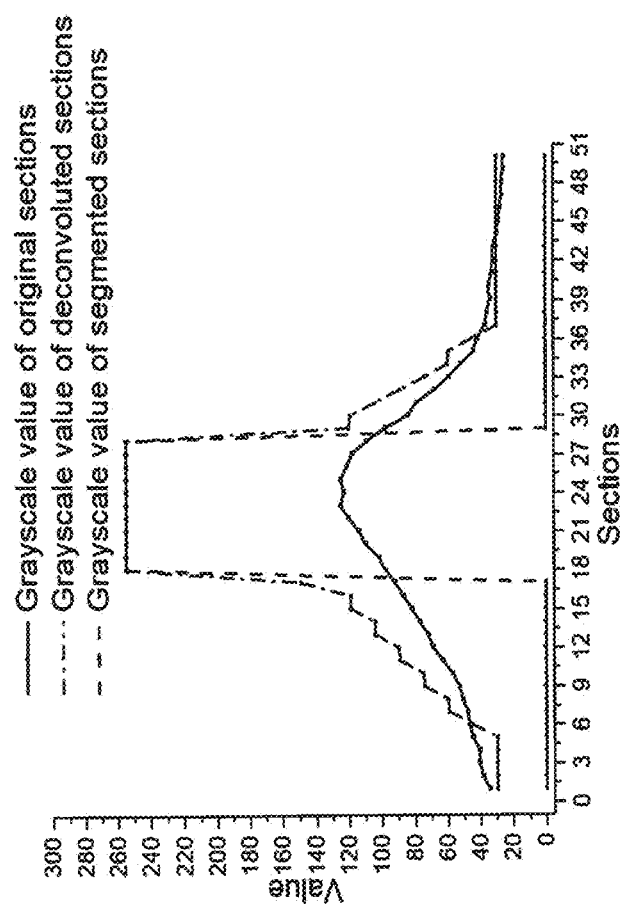
FIG. 8F is a graph showing the grayscale values of an inter-point of the original images, the deconvoluted images (deconvoluted using the method of FIG. 4), and the segmented images (segmented using the method of FIG. 5)

FIG. 8F shows the grayscale values of an inter-point of the original images, the deconvoluted images (deconvoluted using the method of FIG. 4), and the segmented images (segmented using the method of FIG. 5). As shown in the Figure, the blurred projection was substantially reduced or eliminated.

Figure 8G:
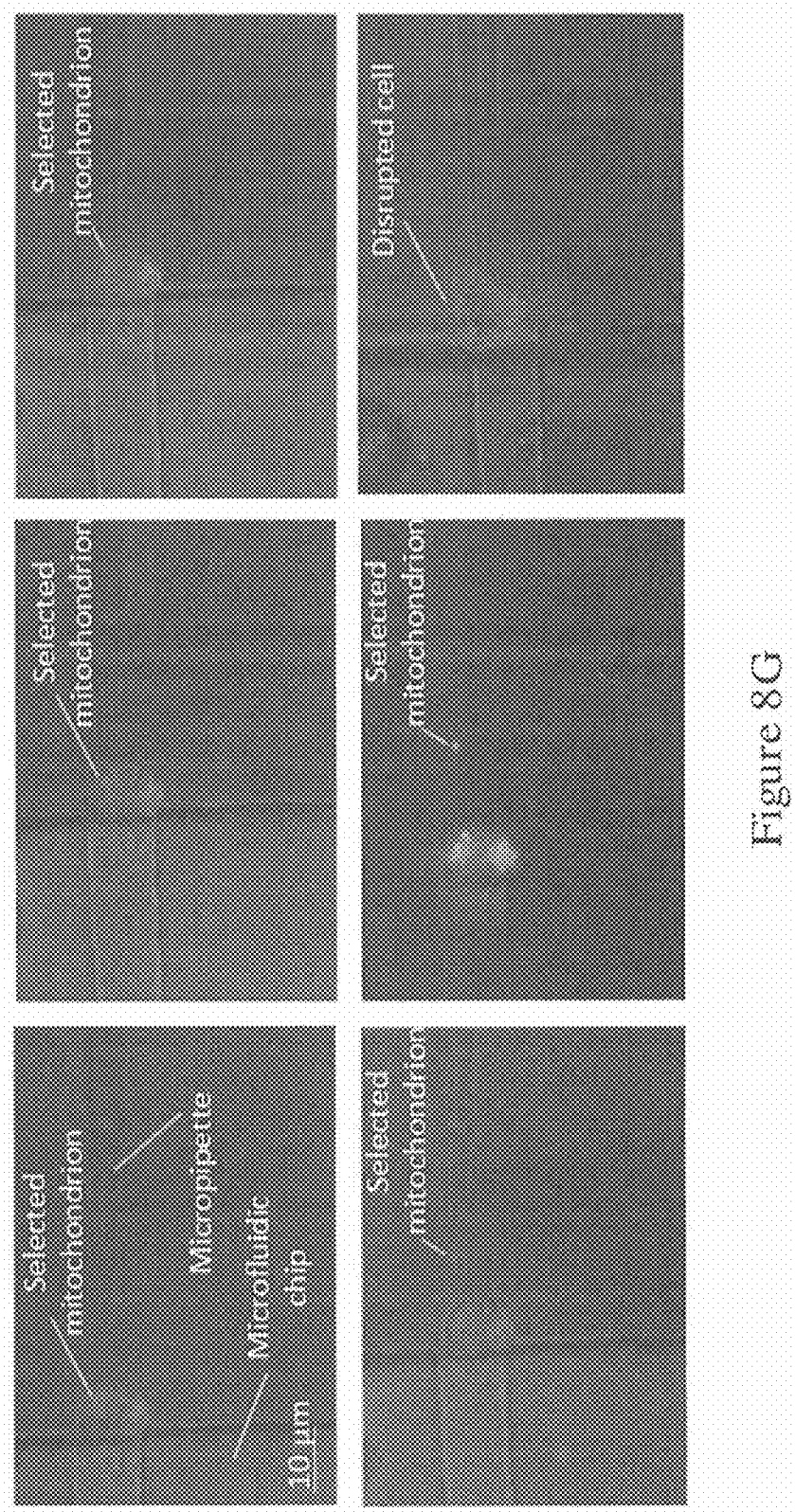
FIG. 8G is a series of images showing the extraction of the selected mitochondria in the mitochondria extraction experiment (of FIG. 8A) using the system of FIG. 1B.

With the reconstructed 3D model of organelles, the system 100 automatically selected the 25th section in this mitochondrion extraction experiment. The manipulator 105 was moved to this selected position, and an extraction experiment was conducted. FIG. 8G contains a series of images that show the process of extracting the selected mitochondria. Beginning from the image in the top left corner, the automatic height adjustment of the micro-pipette 106 is shown. Then, in the image right next to the first, the micro-pipette 106 was moved on the XY plane and approached the selected mitochondrion. In the image in the top right corner, the micro-pipette 106 reached the selected point and extracted the selected mitochondrion. In the image in the bottom left corner, the selected mitochondrion was successfully extracted out of the cell with an aspiration pressure of 1 psi. And importantly, the cell remained intact after the operation. The membrane potential of the mitochondria is an important criterion for viability study. The fluorescence emission of depolarized mitochondria changed from orange to green. In the lower middle image, the fluorescence of the mitochondria (10 min after extraction) was tested and illustrated. An orange fluorescence was observed in all cases, indicating the 100% survival rate of the extracted mitochondria.

An extraction experiment without the use of 3D information was also conducted for comparison. The result was show in the bottom right image. Here, as the micropipette 106 position could not be placed into the optimal position, the success rate of mitochondrion extraction was low, and the extraction attempts were repeated several times. As a result, cells were fragile to withstand multiple extractions and finally disrupted.

Figure 9:
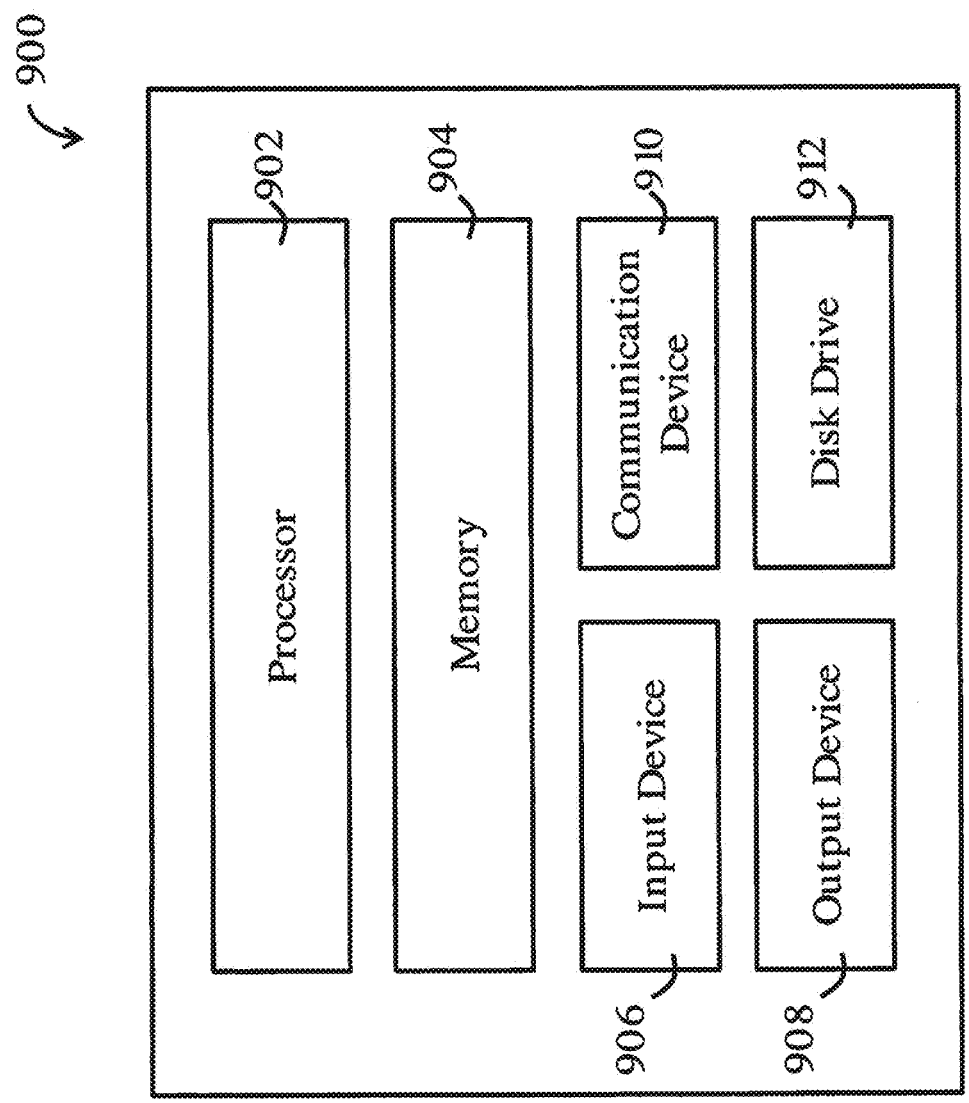
FIG. 9 is a functional block diagram of an information handling system for performing the method of FIG. 2 in one embodiment of the invention.

FIG. 9 shows a schematic diagram of an exemplary information handling system 900 that can be used as a processor, computer, or other information processing systems for performing the methods in the above embodiments (e.g., the methods of FIGS. 2 to 6). The information handling system 900 may have different configurations, and it generally includes suitable components necessary to receive, store, and execute appropriate computer instructions, commands, or codes. The main components of the information handling system 900 are a processor 902 and a memory unit 904. The processor 902 may be formed by one or more CPU, MCU, controllers, logic circuits, Raspberry Pi chip, etc. The memory unit 904 may include one or more volatile memory unit (such as RAM, DRAM, SRAM), one or more non-volatile unit (such as ROM, PROM, EPROM, EEPROM, FRAM, MRAM, FLASH, SSD, NAND, and NVDIMM), or any of their combinations. Preferably, the information handling system 900 further includes one or more input devices 906 such as a keyboard, a mouse, a stylus, an image scanner, a microphone, a tactile input device (e.g., touch sensitive screen), and an image/video input device (e.g., camera). The information handling system 900 may further include one or more output devices 908 such as one or more displays (e.g., monitor), speakers, disk drives, headphones, earphones, printers, 3D printers, etc. The display may include a LCD display, a LED/OLED display, or any other suitable display that may or may not be touch sensitive. The information handling system 900 may further include one or more disk drives 912 which may encompass solid state drives, hard disk drives, optical drives, flash drives, and/or magnetic tape drives. A suitable operating system may be installed in the information handling system 900, e.g., on the disk drive 912 or in the memory unit 904. The memory unit 904 and the disk drive 912 may be operated by the processor 902. The information handling system 900 also preferably includes a communication device 910 for establishing one or more communication links (not shown) with one or more other computing devices such as servers, personal computers, terminals, tablets, phones, or other wireless or handheld computing devices. The communication device 910 may be a modem, a Network Interface Card (NIC), an integrated network interface, a radio frequency transceiver, an optical port, an infrared port, a USB connection, or other wired or wireless communication interfaces. The communication links may be wired or wireless for communicating commands, instructions, information and/or data. Preferably, the processor 902, the memory unit 904, and optionally the input devices 906, the output devices 908, the communication device 910 and the disk drives 912 are connected with each other through a bus, a Peripheral Component Interconnect (PCI) such as PCI Express, a Universal Serial Bus (USB), an optical bus, or other like bus structure. In one embodiment, some of these components may be connected through a network such as the Internet or a cloud computing network. A person skilled in the art would appreciate that the information handling system 900 shown in FIG. 2 is merely exemplary and different information handling systems 900 with different configurations may be applicable for performing the methods in the above embodiments (e.g., the methods of FIGS. 2 to 6).

Although not required, the embodiments described with reference to the Figures can be implemented as an application programming interface (API) or as a series of libraries for use by a developer or can be included within another software application, such as a terminal or personal computer operating system or a portable computing device operating system. Generally, as program modules include routines, programs, objects, components and data files assisting in the performance of particular functions, the skilled person will understand that the functionality of the software application may be distributed across a number of routines, objects or components to achieve the same functionality desired herein.

It will also be appreciated that where the methods and systems of the invention are either wholly implemented by computing system or partly implemented by computing systems then any appropriate computing system architecture may be utilized. This will include stand-alone computers, network computers, dedicated or non-dedicated hardware devices. Where the terms "computing system" and "computing device" are used, these terms are intended to include any appropriate arrangement of computer or information processing hardware capable of implementing the function described.

The above embodiments have provided a system and method for manipulating a biological sample, and a method for processing images of a biological sample. In one specific implementation, there is provided a method for reconstructing cells or intracellular organelles with wide field fluorescence microscope, and a robot-aided wide field fluorescence microscope system for intracellular surgeries based on 3D information feedback obtained using imaging and image processing. Some of the system and method embodiments can facilitate intracellular surgeries by providing reliable 3D position information. The success rate of operation was largely improved, and operation damage was reduced. The system and method presented are suited for intracellular surgeries, such as organelle biopsy and cell injection.

In one embodiment, the system and method are for 3D image reconstruction using wide field fluorescence microscope (WFFM), an imaging modality that offers unique advantages over other imaging systems such as X-Ray, computer tomography (CT), magnetic resonance imaging (MRI), confocal fluorescence microscopy (CFM), etc. Some system and method embodiments of the invention can be readily integrated with tool manipulation device (e.g., robotic micromanipulators) and tools for manipulating the biological sample. The operation is simple and can be automated.

The images sampled by WFFM contain out-of-focus blurs and noises and thus require the restoration of original images. In one embodiment, the deconvolution method utilized multiple PSFs calculated at each optical sections, and it provides improved accuracy. In order to eliminate the ringing effect that produces local overshoots and undershoots, some method embodiments utilize a segmentation process for obtaining a distinct and clear boundary of restored images.

The 3D model of the biological sample reconstructed using the method of the above embodiments can provide reliable information for improving the success rate of manipulation (surgery) while reducing operation damage. It also provides much improved performance over manually control by human operators.

It will be appreciated by persons skilled in the art that numerous variations and/or modifications may be made to the invention as shown in the specific embodiments without departing from the spirit or scope of the invention as broadly described. The described embodiments of the invention should therefore be considered in all respects as illustrative, not restrictive. For example, the methods embodiments can be implemented using any systems embodiments. The method steps illustrated may be performed in a different order, where appropriate. In some embodiments, the method may include additional steps, or less steps than shown. Some of the system and method embodiments are preferably (but not limited to) applied in wide-field fluorescence microscopy.

The invention claimed is:

1. A system for manipulating a biological sample, comprising:
   an imaging device arranged to image a biological sample;
   a controller operably connected with the imaging device for processing images obtained by the imaging device; and
   a tool manipulation device operably connected with the controller and arranged to be connected with a tool for manipulating the biological sample;
   wherein the controller is arranged to control operation of the tool manipulation device based on the processing of the images;
   wherein the imaging device is part of an imaging apparatus; and
   wherein the imaging apparatus includes a support for holding the biological sample, and an objective lens.

2. The system of claim 1, wherein the controller is arranged to control operation of the tool manipulation device to effect movement of the tool relative to the biological sample.

3. The system of claim 1, further comprising a tool connected with the tool manipulation device.

4. The system of claim 3, wherein the tool comprises a micro-tool.

5. The system of claim 4, wherein the tool comprises a surgical tool for intracellular surgery.

6. The system of claim 5, wherein the tool includes one or both of a micro-pipette and a micro-injector.

7. The system of claim 1, wherein the imaging apparatus further includes movement means for moving one or both of the support and the objective lens to enable relative movement between the support and the objective lens.

8. The system of claim 7, wherein the movement means is arranged such that the relative movement is in a vertical direction.

9. The system of claim 7, wherein the controller is further arranged to control movement of the movement means.

10. The system of claim 9, wherein the controller is arranged to control movement of the movement means such that the relative movement is in steps.

11. The system of claim 1, wherein the imaging device comprises a CCD camera or a sCMOS camera for obtaining images with optical sections of the biological sample.

12. The system of claim 1, wherein the imaging apparatus includes a microscope.

13. The system of claim 12, wherein the microscope is a wide-field fluorescence microscope.

14. The system of claim 13, wherein the controller is arranged to process the images by:
   deconvoluting the images for removing noises and blurs in the images;
   segmenting the deconvoluted images; and
   reconstructing a 3D model of the biological sample based on the segmented deconvoluted images.

15. A method for operating the system of claim 1, comprising:
   moving the biological sample relative to the imaging device for obtaining images with optical sections of the biological sample; and
   imaging the biological sample using the imaging device to obtain images with optical sections of the biological sample.

16. The method of claim 15, wherein the relative movement is in steps and the imaging device is arranged to image the biological sample at each steps.

17. The method of claim 16, further comprising:
   processing the obtained images; and
   controlling operation of the tool manipulation device based on the processing of the images.

18. The method of claim 17, wherein controlling operation of the tool manipulation device comprises effecting movement of the tool relative to the biological sample.

19. The method of claim 18, further comprising:
   manipulating the biological sample using the tool based on the controlled operation of the tool manipulation device.

20. A method for processing images of a biological sample, comprising:
   deconvoluting the images for removing noises and blurs in the images;
   segmenting the deconvoluted images; and
   reconstructing a 3D model of the biological sample based on the segmented deconvoluted images;
   wherein the deconvolution comprises:
      processing the respective images to determine one or more point spread functions for at each optical sampling depth; and
      retrieving one or more predetermined point spread functions from a controller based on the processing of the respective images.

21. The method of claim 20, wherein the images are fluorescence images obtained with a fluorescence microscope.

22. The method of claim 20, wherein the deconvolution further comprises:
   determining deconvolution estimation of the respective images based on the one or more determined point spread functions.

23. The method of claim 22, wherein the deconvolution further comprises:
   determining noise regularized estimations of the respective images based on the deconvolution estimation of the respective images; wherein the determination of the noise regularized estimations is based on a regularization factor.

24. The method of claim 20, wherein the deconvolution further comprises:
   processing the images to turn the images into grayscale images prior to determining the one or more point spread functions.

25. The method of claim 20, wherein the segmentation of the deconvoluted images is based on a localized region-based segmentation method.

26. The method of claim 20, wherein the reconstruction of the 3D model is based on volume rendering.

27. A system for manipulating a biological sample, comprising:
   a camera arranged to image a biological sample, the camera being part of a wide-field fluorescence microscope;
   a controller operably connected with the camera for processing fluorescence images obtained by the camera; and
   a tool manipulation device operably connected with the controller and arranged to be connected with a tool for manipulating the biological sample,
   wherein the controller is arranged to control operation of the tool manipulation device based on the processing of the fluorescence images;
   wherein the controller is arranged to process the fluorescence images by:

deconvoluting the fluorescence images for removing noises and blurs in the fluorescence images;
segmenting the deconvoluted images; and
reconstructing a 3D model of the biological sample based on the segmented deconvoluted images.

28. The system of claim 27, wherein the wide-field fluorescence microscope includes:
a support for holding the biological sample,
an objective lens; and
a movement means for moving one or both of the support and the objective lens to enable relative movement between the support and the objective lens.

29. The system of claim 28, wherein the controller is further arranged to control movement of the movement means.

30. A method for processing images of a biological sample, comprising:
deconvoluting the images for removing noises and blurs in the images;
segmenting the deconvoluted images; and
reconstructing a 3D model of the biological sample based on the segmented deconvoluted images;
wherein the deconvolution comprises:
processing the respective images to determine one or more point spread functions for at each optical sampling depth; and
processing the images to turn the images into grayscale images prior to determining the point spread functions.

31. The method of claim 30, wherein the images are fluorescence images obtained with a fluorescence microscope.

32. The method of claim 30, wherein the deconvolution further comprises:
retrieving one or more predetermined one or more point spread functions based on the processing of the respective images.

33. The method of claim 32, wherein the deconvolution further comprises:
determining deconvolution estimation of the respective images based on the one or more determined point spread functions.

34. The method of claim 33, wherein the deconvolution further comprises:
determining noise regularized estimations of the respective images based on the deconvolution estimation of the respective images; wherein the determination of the noise regularized estimations is based on a regularization factor.

35. The method of claim 30, wherein the segmentation of the deconvoluted images is based on a localized region-based segmentation method.

36. The method of claim 30, wherein the reconstruction of the 3D model is based on volume rendering.

* * * * *